Figure 1:
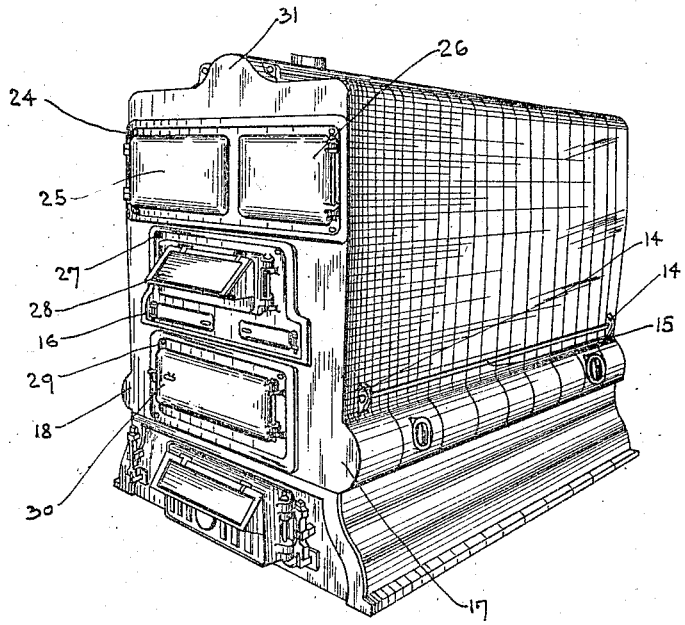

C. H. HOOK.
DOWNDRAFT SMOKE CONSUMING BOILER FURNACE.
APPLICATION FILED FEB. 3, 1915.

1,151,592.

Patented Aug. 31, 1915
3 SHEETS—SHEET 1.

WITNESSES:
W. A. Budd
B. M. Bogan

INVENTOR.
C. H. Hook
BY Nicholas L. Bogan
ATTORNEY.

C. H. HOOK.
DOWNDRAFT SMOKE CONSUMING BOILER FURNACE.
APPLICATION FILED FEB. 3, 1915.

1,151,592.

Patented Aug. 31, 1915.
3 SHEETS—SHEET 2.

WITNESSES:
W. A. Budd
B. M. Bogan

INVENTOR.
C. H. Hook
BY Nicholas L. Bogan
ATTORNEY.

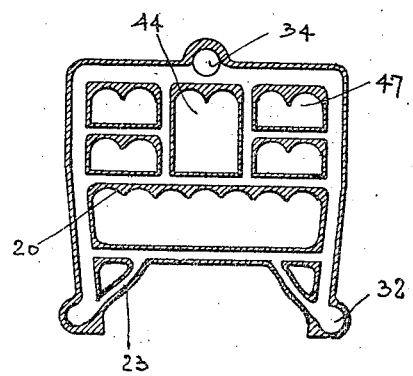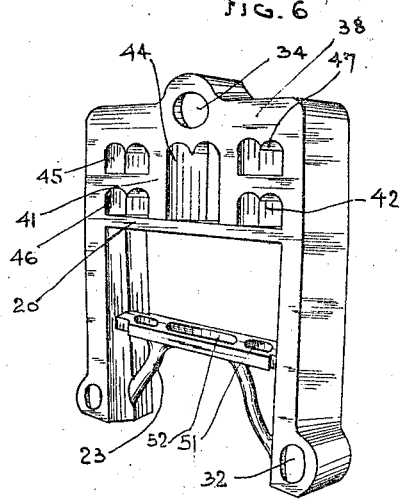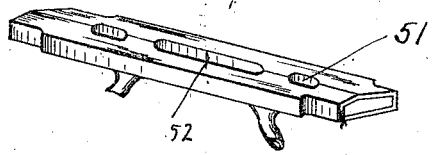

UNITED STATES PATENT OFFICE.

CHARLES HOWARD HOOK, OF PITTSBURGH, PENNSYLVANIA.

DOWNDRAFT SMOKE-CONSUMING BOILER-FURNACE.

1,151,592.  Specification of Letters Patent.  Patented Aug. 31, 1915.

Application filed February 3, 1915. Serial No. 5,833.

*To all whom it may concern:*

Be it known that I, CHARLES HOWARD HOOK, a citizen of the United States, residing at Pittsburgh, in the county of Allegheny and State of Pennsylvania, have invented certain new and useful Improvements in Downdraft Smoke-Consuming Boiler-Furnaces, of which the following is a specification.

This invention relates to down draft smoke consuming boiler furnaces and has for its object to provide a furnace of such type, in a manner as hereinafter set forth, with means to provide a large water flue area in a compact furnace body whereby a rapid generation of steam is had from a minimum consumption of fuel.

A further object of the invention is to provide a furnace of the type referred to, in a manner as hereinafter set forth, with a pair of combustion chambers which are utilized for the consumption of the smoke giving heat units under such conditions preventing waste of heat units and facilitating the generation of steam, at the same time overcoming the discharge of waste smoke containing valuable heat units.

A further object of the invention is to provide a furnace of the type referred to, in a manner as hereinafter set forth, with an arrangement of flues positioned to break the water up into a vast number of small streams and further positioned whereby the flues will be quickly attacked by the heat under such conditions making quick steam and responsive circulation with a minimum amount of fuel.

A further object of the invention is to provide a furnace of the type referred to, with means in a manner as hereinafter set forth, to provide for the quick generation of steam with a minimum consumption of fuel.

A further object of the invention is to provide a furnace of the type referred to, with means in a manner as hereinafter set forth, to prevent the pocketing of the heat units at the rear of the bridge wall.

A further object of the invention is to provide a furnace of the type referred to, in a manner as hereinafter set forth to provide for a convenient access to the front and to the rear of the furnace when occasion so requires.

A further object of the invention is to provide a furnace of the type referred to, with means in a manner as hereinafter set forth, to facilitate the circulation of the heat units with respect to an increased flue area under such conditions providing for a quick generation of steam at a minimum consumption of fuel.

Further objects of the invention are to provide a furnace of the type referred to which is comparatively simple in its construction and arrangement, strong, durable, efficient, convenient in its use, readily assembled and comparatively inexpensive to set up.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which comes within the scope of the claims hereunto appended.

Figure 2:
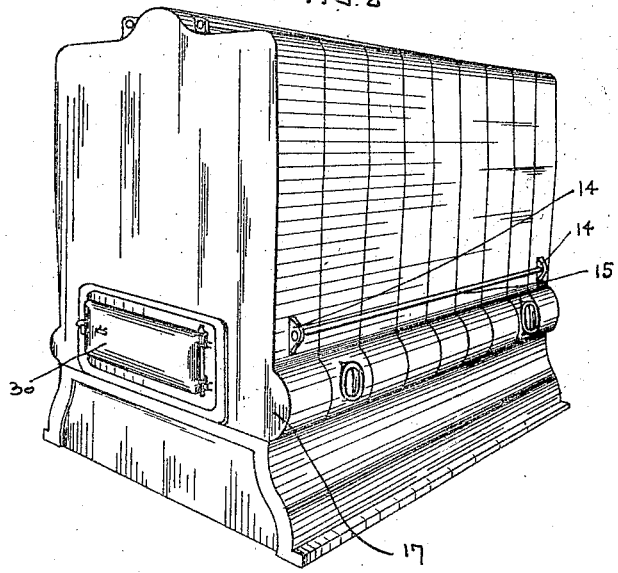
Figure 3:
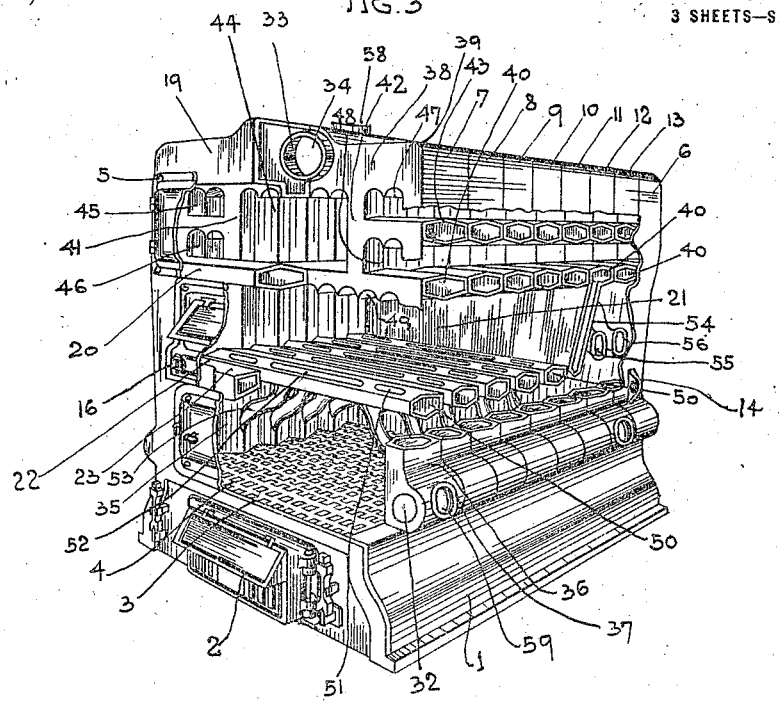
Figure 4:
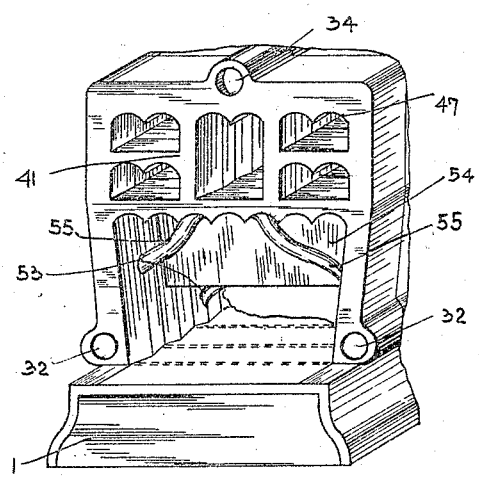

In the drawings wherein like reference characters denote corresponding parts throughout the several views:—Figure 1 is a perspective view of a smoke consuming, down draft boiler furnace in accordance with this invention, looking toward the front of the furnace. Fig. 2 is a similar view looking toward the rear of the furnace. Fig. 3 is a sectional elevation looking toward the front of the furnace. Fig. 4 is an elevation looking toward the bridge wall with the back of the furnace removed. Fig. 5 is a perspective view of one of the furnace units. Figs. 6 and 7 are details.

Referring to the drawings in detail 1 denotes a base, which constitutes an ash pit and entrance to the latter is had through the medium of a door 2. Supported by the base 1 is a plurality of rocking grates 3 of any suitable construction and the said rocking grates 3 provide the bottom of the lower combustion chamber 4.

The furnace further includes a body portion, which is mounted upon the base 1, and which consists of a front unit 5, a rear unit 6, and a plurality of intermediate units, as illustrated seven in number, but this number can be increased or diminished, and the number of intermediate units is shown merely by way of example and said intermediate units are indicated by the reference characters 7, 8, 9, 10, 11, 12 and 13.

The front unit 5, as well as the rear unit 6, each has a lateral projecting apertured ear 14. The apertured ears 14 are arranged in proximity to the lower ends of said front unit 5 and rear unit 6 and the apertured ears 14 of the front unit 5 are arranged in alinement with the apertured ears 14 of the unit 6 and extending through said alining ears are tie bars 15 for connecting the front unit 5 and rear unit 6 together, and for further securing in position the intermediate units 7 to 13.

The front unit 5 includes a pair of hollow legs 16, 17, and each of said legs at its lower end has a circular offset 18. The legs 16, 17 merge into a hollow arch 19 which forms a section of the top of the furnace. Below the hollow arch 19 and legs 16, 17, are connected together by a hollow tube 20 which forms one section of the top of the primary combustion chamber, the latter is indicated at 21, arranged above the combustion chamber 4, termed the secondary combustion chamber. The legs 16, 17, are furthermore connected by a hollow tube 22, having the intermediate portion thereof offset as at 23 and the said tube 22 forms one of the hollow grate bars or one of the sections of the bottom of the primary combustion chamber. The bar 22 also constitutes one section of the top of the secondary combustion chamber 4.

Secured to the front of the front section 5, is a plate 24, having a pair of door openings which are closed by the doors 25, 26, and these latter provide means whereby access can be had to the heat flues at the upper end of the furnace.

Secured to the front section 5 is a plate 27, which provides a door opening, and the latter is closed by a door 28 and said door 28 provides means whereby access can be had to the primary combustion chamber 21 so that the fuel can be supplied thereto or said combustion chamber 21 cleaned when occasion so requires.

Secured to the front section 5 is a plate 29, which forms a door opening and the latter is closed by a door 30, which provides means whereby access can be had to the secondary combustion chamber 4 when occasion so requires. The front section 5, centrally thereof, has an upwardly extending circular enlargement 31.

The bottoms of the legs 16, 17, are closed, with the exception, that the rear sides of the legs 16, 17, near their lower ends, have openings which communicate with the openings 32 formed in the front sides of the legs of the intermediate section 7. The arch 19 of the front section 5 is closed, with this exception, that centrally thereof at its rear has an opening 33, which communicates with an opening 34 formed in the front of the arch of the intermediate section 7.

The intermediate sections 7, 8, 9, 10 and 11 are similar in construction, and the description of one will apply to the other and each of the intermediate sections, as designated, consists of a pair of hollow legs 35, 36, closed at their bottoms with this exception, that the front side of the lower ends of said legs are provided with the openings 32 for establishing communication therebetween and the legs 16, 17 and the legs 35, 36, are at their rear furthermore provided, with openings 37 for establishing communication between the legs of adjacent intermediate sections. The legs 35, 36, terminate in a hollow arch 38, which has openings 34 and 38 for establishing communication between the arches adjacent sections. The legs 35, and 36, below the arch 38, are connected together by a hollow tube 40, and said tube 40 is connected with the arch 38 by a pair of spaced vertically disposed tubes 41 and 42, removed from the legs 35, 36. The vertically disposed tubes 41, 42, are connected to the legs 35, 36, by short hollow tubes 43. The tube 40 forms a section of the top of the primary combustion chamber 21. The arch 38, in connection with the tube 40 and the tubes 41 and 42 provide heat flues 44. The legs 35, 36, in connection with the arch 38, tubes 41, 42, and tubes 43, form heat flues 45, 46, 47 and 48. The tubes 40 have their lower surfaces corrugated as at 49.

The legs 35, 36, below the tube 40, are connected together by a hollow tube 50, having reduced ends and a pair of longitudinally disposed end openings 51 and a longitudinally disposed intermediate opening 52. The latter is of greater length than either of the former. The tube 50 forms one of the grate bars or a section of the bottom of the primary combustion chamber 21, and the reduced ends of the tube and openings 51, 52, provide means for the passage of hot coals from the primary combustion chamber 21 into the secondary combustion chamber 4 to form a bed of live fuel in said latter chamber.

Leading from the lower section of each leg 35, 36, and merging into a tube 50, is a tube 53, of any suitable shape preferably of compound curvature or S-shape. The upper ends of the curved tubes 53 preferably are spaced from each other, and said tubes 53 establish communication between the legs 35, 36, and the tube 50 to provide for the circulation of water across the upper portion of the chamber 4 in additional to the circulation of water at the sides and top of the chamber 4.

The tubes 50 of the intermediate sections 7 to 11, both inclusive, provide the bottom on the grate of the primary combustion chamber 21, and are disposed preferably in a horizontal plane and although the preferred construction of these tubes 50 is illustrated, yet it is to be understood the tubes may be arranged in curvilinear alinement so as to set up a concave grate, or bottom. The tubes 50 also constitute the top of the secondary combustion chamber 4.

The intermediate section 12 has its upper portion constructed similar to that of the intermediate sections 7 to 11, with this exception that the tube 40 of said intermediate section 12 has depending therefrom a hollow bridge wall 54, which extends to the tube 50 of the section 11 and is formed integral with the legs 35, 36, of the section 12, as well as communicating with said legs. The intermediate section 12 is not provided with a tube 50 and leading from the legs 35, 36, of said section 12 and the tube 40 are oppositely disposed tubes 55, preferably of compound curvature or S-shape.

The upper portion of the intermediate section 13 is constructed similar to the upper portions of the intermediate sections 7 to 11, but the intermediate section 13 is not provided with a tube 50, and leading from the legs 35, 36, from the intermediate portion 13 to the tube 40 are oppositely disposed tubes 56, preferably of compound curvature or S-shape.

The rear section 6 is of the same construction as the front section 5, with this exception, that it is provided with a single door opening, closed by a door 57, whereby access can be had to the rear of the entrance.

An outlet 58 is provided in the rear section, and inlets 59 are formed in the intermediate sections.

By setting up the water tubes in a manner as stated a vast number of water ways is provided which splits the water up in small streams and the tubes which provide such water ways can be quickly attacked by the heat thereby facilitating the rapid generation of steam.

The fire is built in the primary combustion chamber 21, and owing to the arrangement of the draft it is obvious that the smoke will be drawn down into the secondary combustion chamber 4. As the live coals fall through the openings in the grate of the primary combustion chamber 21 and onto the grate 3 of the secondary combustion chamber 4, a bed of incandescent fuel will be accumulated, and as the smoke is drawn through the fire in the primary combustion chamber and into the secondary combustion chamber, the incandescent fuel will consume the heat giving units carried by the smoke instead of allowing of a waste of smoke thereby making quick steam with a minimum amount of fuel. The heat flues provide for quick circulation of the heat and as the water tubes form the walls of such flues it is obvious that there could not be otherwise than a quick generation of steam. The water not only circulates through the tubes forming the heat flues, but also through the bridge wall, the grate bars of the primary combustion chamber and through the tip of the secondary combustion chamber.

As the intermediate sections 7 to 12, with their vertically disposed tubes 41 and 42, are spaced from the front section 5 and rear section 6, it is obvious that nothing is set up to retard the passage of the heat through the heat flues.

By setting up the furnace, at the rear of the bridge wall 54, in the manner as illustrated, the formation of pockets are overcome and the circulation of the heat is not retarded.

What I claim is:—

1. A down draft smoke consuming boiler furnace comprising an upper and a lower fuel combustion chamber each having side walls formed with passages for the circulation of water, said upper chamber provided with a bridge wall at and said lower chamber open at the rear thereof, said upper chamber having its bottom consisting of hollow grate bars providing passages for water circulation opening into the water passages in the side walls of said chamber, said bars forming the top of said lower chamber, and means communicating with and extending from each of the water passages in the side walls of and opening into the hollow grate bars to provide passages for the circulation of water.

2. A down draft smoke consuming boiler furnace comprising an upper and a lower fuel combustion chamber each having side walls formed with passages for the circulation of water, said upper chamber provided with a bridge wall at said lower chamber open at the rear thereof, said upper chamber having its bottom consisting of hollow grate bars providing passages for water circulation opening into the side water passages in the walls of said chamber, said bars forming the top of said lower chamber, and inwardly projecting curved tubes communicating with and extending from each of the water passages in the side walls of and opening at their upper ends into said grate bars to provide passages for the circulation of water.

3. A down draft smoke consuming boiler furnace comprising an upper and a lower fuel combustion chamber each having side walls formed with passages for the circulation of water, said upper chamber provided with a bridge wall at and said lower chamber open at the rear thereof, said upper chamber having its bottom formed by hollow grate bars providing passages for water circulation opening into the water passages in the side walls of said chamber, said bars forming the top of said lower chamber and having means to provide vertically disposed openings independent of the water passages formed in said grate bars, said openings providing means for the passage of live coals from the upper to the lower chamber to form a bed of live fuel in said lower chamber to consume the smoke as it passes down through the grate bars.

4. A down draft smoke consuming boiler furnace comprising an upper and a lower fuel combustion chamber each having side walls formed with passages for the circulation of water, said upper chamber provided with a bridge wall at and said lower chamber open at the rear thereof, said upper chamber having its bottom formed of hollow grate bars providing passages for water circulation opening into the side walls of said chamber, said bars forming the top of said lower chamber and means to provide vertically disposed openings independent of said water passages formed in said grate bars, said openings providing means for the passage of live coals from the upper to the lower chamber to form a bed of live fuel in said lower chamber to consume the smoke as it passes down through the grate bars, and means communicating with and extending from each of the water passages of said side walls of and opening into the grate bars to provide passages for the circulation of water.

5. A down draft smoke consuming boiler furnace comprising an upper and a lower fuel combustion chamber each having side walls formed with passages for the circulation of water, said upper chamber provided with a bridge wall at and said lower chamber open at the rear thereof, said upper chamber having its bottom formed of hollow grate bars providing passages for water circulation opening into the side walls of said chamber, said bars forming the top of said lower chamber and having means to provide vertically disposed openings independent of the water passages formed in said grate bars, said openings permitting the passage of live coals from the upper to the lower chamber to form a bed of live fuel in said lower chamber to consume the smoke as it passes down through the grate bars, and inwardly projecting curved tubes communicating with and extending from each of the side walls of and opening into the water passages of grate bars to provide passages for the circulation of water.

6. A down draft smoke consuming boiler furnace comprising an upper and a lower fuel combustion chamber each having side walls formed with passages for the circulation of water, said upper chamber having its bottom formed of hollow grate bars providing passages for the water circulation opening into the side walls of said chamber, said grate bars forming the top of said lower chamber and having means to provide vertically disposed openings independent of the water passages formed in said grate bars, said openings permitting the passage of live coals from the upper to the lower chamber to provide a bed of live fuel in said lower chamber to consume the smoke as it passes down through the grate bars.

7. A down draft smoke consuming boiler furnace comprising an upper and a lower fuel combustion chamber each having side walls formed with passages for the circulation of water, said upper chamber having the bottom thereof formed of hollow grate bars providing passages for water circulation opening into the passages of the side walls of said chamber, said grate bars forming the top of said lower chamber and having means to provide vertically disposed openings independent of the water passages formed in said grate bars, said openings permitting of the passage of live coals from the upper to the lower chamber to provide a bed of live fuel in said lower chamber to consume the smoke as it passes down through the grate bars, and means communicating with and extending from the water passages of the side walls of and opening into the grate bars forming top of said lower chamber to provide for the circulation of water.

8. A down draft smoke consuming boiler furnace comprising an upper and a lower fuel combustion chamber each having side walls formed with passages for the circulation of water, said upper chamber having the bottom thereof formed of hollow grate bars providing passages for water circulation opening into the passages of the side walls of said chamber, said grate bars forming the top of said lower chamber and having means to provide vertically disposed openings independent of the water passages formed in said grate bars, said openings permitting of the passage of live coals from the upper to the lower chamber to provide a bed of live fuel in said lower chamber to consume the smoke as it passes down through the grate bars, and inwardly projecting curved tubes communicating with and extending from each of the water passages of the side walls of the opening into the grate bars forming the top of said lower chamber to provide for the circulation of water.

9. A down draft smoke consuming boiler furnace comprising an upper and a lower fuel combustion chamber each having side walls provided with passages for the circulation of water, means to provide passages for the circulation of water over said upper chamber and for further forming a central longitudinal heat flue and outer superposed longitudinal heat flues at each side of said central flue and communicating with each other, tubes for water circulation opening into said walls providing grate bars for the upper chamber and the top of said lower chamber, a bridge wall at the rear of said upper chamber, and tubes communicating with and extending from each of the side walls of said lower chamber below the grate bars and opening into said means at the rear of the bridge wall and providing for the circulation of water rearwardly of the bridge wall.

10. A down draft smoke consuming boiler furnace comprising an upper and a lower fuel combustion chamber each having side walls provided with passages for the circulation of water, means to provide passages for the circulation of water over said upper chamber and for further providing a central longitudinal heat flue and outer superposed longitudinal heat flues at each side of and communicating with said central flue, tubes for water circulation opening into said side walls and providing grate bars for the upper chamber and the top of said lower chamber, a bridge wall at the rear of said upper chamber, and tubes communicating with and extending from each of the side walls of said lower chamber below the top thereof and opening into said means at the rear of said bridge wall and providing for the circulation of water rearwardly of the bridge wall, said grate bars having means to provide vertically disposed openings independent of the water passages formed in said grate bars, said openings permitting for the passage of live coals from the upper to the lower chamber to form a bed of live fuel in the lower chamber to consume the smoke as it passes down through the grate bars.

11. A down draft smoke consuming boiler furnace comprising an upper and a lower fuel combustion chamber each having side walls provided with passages for the circulation of water, means to provide passages for the circulation of water over said upper chamber and for further providing a central longitudinal heat flue and outer superposed longitudinal heat flues at each side of and communicating with said central flue, tubes for water circulation opening into said side walls and providing grate bars for the upper chamber and the top of said lower chamber, a bridge wall at the rear of said upper chamber, tubes communicating with and extending from each of the side walls of said lower chamber below the top thereof and opening into said means at the rear of said bridge wall and providing for the circulation of water rearwardly of the bridge wall, said grate bars having means to provide vertically disposed openings independent of the water passages formed in said grate bars, said openings permitting for the passage of live coals from the upper to the lower chamber to form in said lower chamber a bed of live fuel to consume the smoke as it passes down through the grate bars, and means communicating with and extending from each of the side walls of and opening into the grate bars forming the top of said lower chamber to provide for the circulation of water in the upper portion of said lower chamber.

12. A down draft smoke consuming boiler furnace comprising an upper and a lower fuel combustion chamber each having side walls formed with passages for the circulation of water, means forming passages for the circulation of water over said upper chamber and further forming flues for the passage of heat, said flues communicating with the rear of the said lower chamber and the passages formed by said means communicating with said walls, tubes forming passages for the circulation of water and opening into said side walls and providing grate bars for the upper chamber and further providing the top of said lower chamber, and means communicating with and extending from each of the said walls of and opening into the grate bars forming the top of said lower chamber to provide for the circulation of water in the upper portion of the lower chamber.

13. A down draft smoke consuming boiler furnace comprising an upper and a lower fuel combustion chamber each having side walls formed with passages for the circulation of water, means forming passages for the circulation of water over said upper chamber and further forming flues for the passage of heat, said flues communicating with the rear of the said lower chamber and the passages formed by said means communicating with said walls, tubes forming passages for the circulation of water and opening into said side walls and providing the top of said lower chamber, and inwardly projecting curved tubes communicating with and extending from each of the side walls of and opening into the grate bars forming the top of said lower chamber to provide for the circulation of water in the upper portion of the lower chamber.

14. A down draft smoke consuming boiler furnace comprising an upper and a lower fuel combustion chamber each having side walls formed with passages for the circulation of water, means forming passages for the circulation of water over said upper chamber and further forming flues for the passage of heat, said flues communicating with the rear of the said lower chamber and the passages formed by said means communicating with said walls, tubes forming passages for the circulation of water and opening into said side walls and providing grate bars for the upper chamber and further providing the top of said lower chamber, and means communicating with and extending from each of the said walls of and opening into the grate bars forming the top of said lower chamber to provide for the circulation of water in the upper portion of said lower chamber, said grate bars having means to provide vertically disposed openings independent of the water passages formed in said grate bars and said openings permitting for the passage of live coals from the upper to the lower chamber to form in the latter a bed of live fuel to consume the smoke as it passes down through the grate bars.

15. A down draft smoke consuming boiler furnace comprising an upper and a lower fuel combustion chamber each having side walls formed with passages for the circulation of water, means forming passages for the circulation of water over said upper chamber and further forming flues for the passage of heat, said flues communicating with the rear of the said lower chamber and the passages formed by said means communicating with said walls, tubed forming passages for the circulation of water and opening into said side walls and providing grate bars for the upper chamber and further providing the top of said lower chamber, and inwardly projecting curved tubes communicating with and extending from each of the side walls of and opening into the grate bars forming the top of said lower chamber to provide for the circulation of water, said grate bars having means to provide vertically disposed openings independent of the water passages formed in said grate bars and said openings permitting for the passage of live coals from the upper to the lower chamber to form in the latter a bed of live fuel to consume the smoke as it passes down through the grate bars.

16. A down draft smoke consuming boiler furnace comprising an upper and a lower combustion chamber each having its top and sides formed with communicating passages for the circulation of water, the top of said lower chamber constituting the bottom of said upper chamber and further providing grate bars for said upper chamber, said grate bars having vertical openings for the passage of live coals from said upper chamber to said lower chamber to form a bed of live fuel to consume the smoke as it passes down through the grate bars, and inwardly projecting tubes communicating with each of the sides of said lower chamber and opening into the grate bars and providing means for the circulation of water.

17. A down draft smoke consuming boiler furnace comprising an upper and a lower combustion chamber each having its top and sides formed with communicating passages for the circulation of water, the top of said lower chamber constituting the bottom of said upper chamber and further providing grate bars for said upper chamber, said grate bars having means to provide vertical openings for the passage of live coals from said upper chamber to said lower chamber to form a bed of live fuel to consume the smoke as it passes down through the grate bars, inwardly projecting tubes communicating with each of the sides of said lower chamber and opening into the grate bars and providing means for circulating of water, and means connected with the top of said upper chamber to provide communicating passages for the circulation of water and further providing flues for the circulation of heat, said flues communicating with said lower chamber.

18. A down draft smoke consuming boiler furnace comprising an upper and a lower combustion chamber each having its top and sides formed with communicating passages for the circulation of water, the top of said lower chamber constituting the bottom of said upper chamber and further providing grate bars for said upper chamber, said grate bars having means to provide vertical openings for the passage of live coals from said upper chamber to said lower chamber to form a bed of live fuel to consume the smoke as it passes down through the grate bars, inwardly projecting tubes communicating with each of the sides of said lower chamber and opening into the grate bars and providing means for the circulation of water, means connected with the top of said upper chamber to provide communicating passages for the circulation of water and further providing flues for the circulation of heat, said flues communicating with said lower chamber, a hollow bridge wall at the end of said upper chamber and opening to the sides of said lower chamber, and upwardly extending tubes arranged at the rear of said bridge wall and opening into and projecting from the sides of said lower chamber and opening into said grate bars and extending to and communicating with said means and providing passages for the circulation of water.

19. A down draft smoke consuming boiler furnace comprising an upper and a lower combustion chamber, water circulating tubes forming the grate of the upper chamber and the top of the lower chamber, the sides of said lower chamber being formed with water passages, and means arranged in said lower chamber and opening into said tubes and into the water passages of the sides for said lower chamber to provide for water circulation through the upper portion of said lower chamber.

20. A down draft smoke consuming boiler furnace comprising an upper and a lower combustion chamber, water circulating tubes forming the grate of the upper chamber and the top of the lower chambers, the sides of said lower chamber being formed with water passages, and pipes arranged in said lower chamber and opening into said tubes and into the water passages of the sides for said lower chamber to provide for water circulation through the upper portion of said lower chamber.

21. A down draft smoke consuming boiler furnace comprising an upper and a lower combustion chamber, water circulating tubes forming the grate of the upper chamber and the top of the lower chamber, the sides of said lower chamber being formed with water passages, and curved pipes arranged in said lower chamber and opening into said tubes and into the water passages of the sides of said lower chamber to provide for water circulation through the upper portion of said lower chamber.

22. A down draft smoke consuming boiler furnace comprising an upper and a lower combustion chamber, water circulating tubes forming the grate of the upper chamber and the top of the lower chamber, the sides of said lower chamber being formed with water passages, and pipes of compound curvature arranged in said lower chamber and opening into said tubes and into the water passages of the sides of said lower chamber to provide for water circulation through the upper portion of said lower chamber.

23. A down draft smoke consuming boiler furnace comprising an upper and a lower combustion chamber adapted to contain a body of live fuel, water circulating tubes forming the grate and bottom of the upper chamber and the top of the lower chamber, the sides of said lower chamber being formed of water passages into which said tubes open, pipes of compound curvature arranged in said lower chamber and opening at their upper ends into said tubes and at their lower ends into the water passages of the sides of said lower chamber for providing for water circulation through the upper portion of said lower chamber, a hollow bridge wall communicating with said water passages and arranged at the rear of said upper chamber, and water circulating pipes of compound curvature arranged at the rear of said bridge wall.

24. A down draft smoke consuming boiler furnace comprising an upper and a lower combustion chamber adapted to contain a body of live fuel, water circulating tubes forming the bottom and the grate of the upper chamber and the top of the lower chamber, the sides of said chambers being formed of water passages, said tubes opening into said water passages, pipes arranged in said lower chamber and opening at their upper ends into said tubes and at their lower ends into the water passages formed in the sides of said lower chamber to provide for water circulation through the upper portion of said lower chamber, a hollow bridge wall arranged at the rear of said upper chamber and opening into said water passages, and pipes for water circulation communicating with said water passages and arranged at the rear of said bridge wall.

In testimony whereof I affix my signature in presence of two witnesses.

CHARLES HOWARD HOOK.

Witnesses:
B. M. BOGAN,
W. D. RANKIN.